U. WEDGE.
TREATING FURNACE GASES.
APPLICATION FILED JAN. 11, 1910.

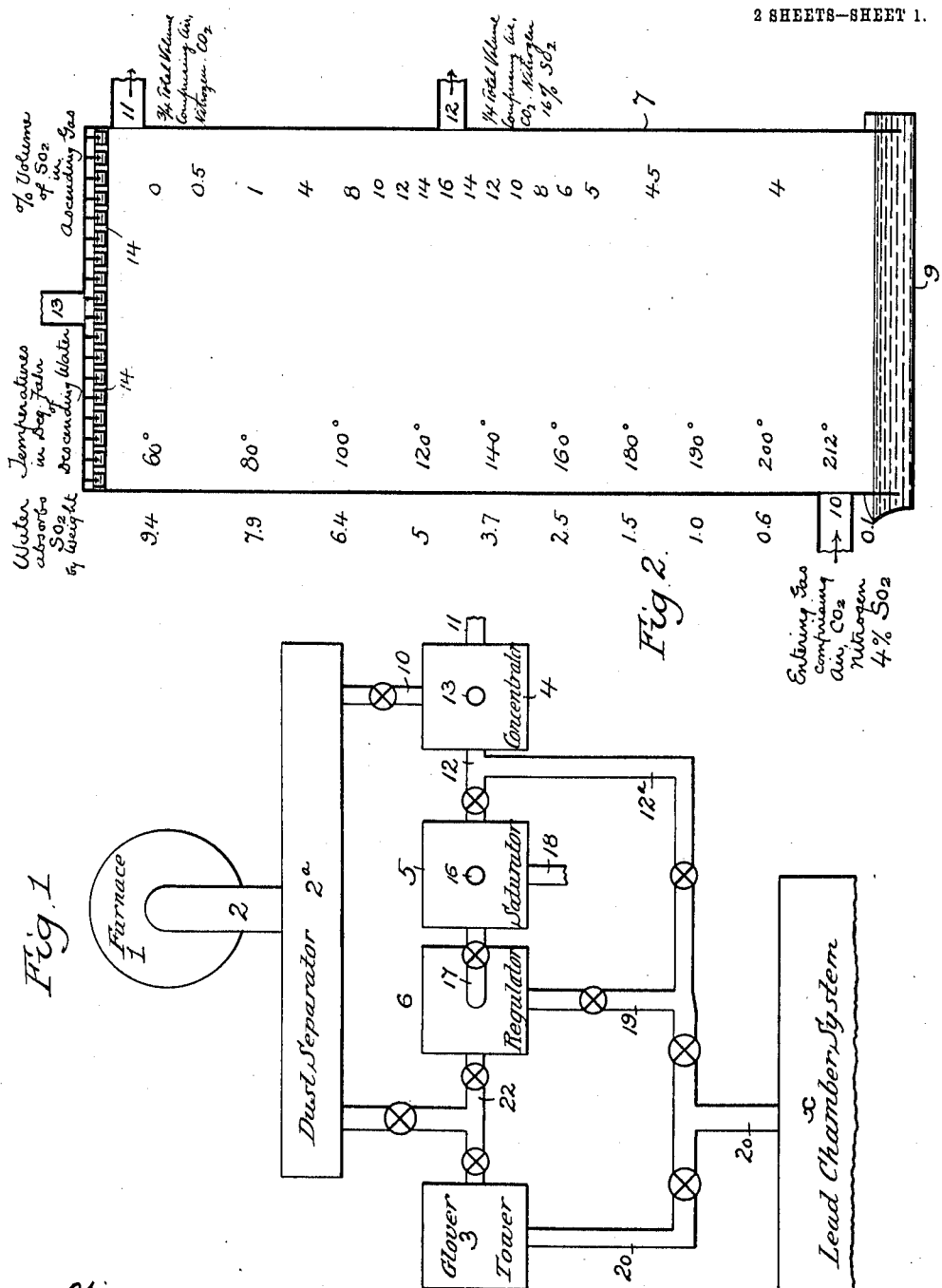

1,039,464.

Patented Sept. 24, 1912.

2 SHEETS—SHEET 2.

Witnesses
Harry L. Smith
Hamilton J. Turner

Inventor
Utley Wedge
his Attorneys
Smith & Mozier

UNITED STATES PATENT OFFICE.

UTLEY WEDGE, OF ARDMORE, PENNSYLVANIA.

TREATING FURNACE-GASES.

1,039,464.  Specification of Letters Patent.  Patented Sept. 24, 1912.

Application filed January 11, 1910. Serial No. 537,485.

*To all whom it may concern:*

Be it known that I, UTLEY WEDGE, a citizen of the United States, residing in Ardmore, Pennsylvania, have invented certain Improvements in Treating Furnace-Gases, of which the following is a specification.

The object of my invention is to increase the percentage of sulfur dioxid in gases from furnaces or converters for smelting pyrites, sulfid ores, copper matte or the like or to separate from the sulfur dioxid, either wholly or in part, the carbon dioxid, and such other impurities or adulterants as may be combined with said sulfur dioxid in the furnace gases, the enriched gases or the sulfur dioxid obtained therefrom being thereby available for effective subsequent use, as for instance in the manufacture of sulfuric or sulfurous acid. This object I attain in the manner hereinafter set forth, reference being had to the accompanying drawings, in which—

Figure 4:
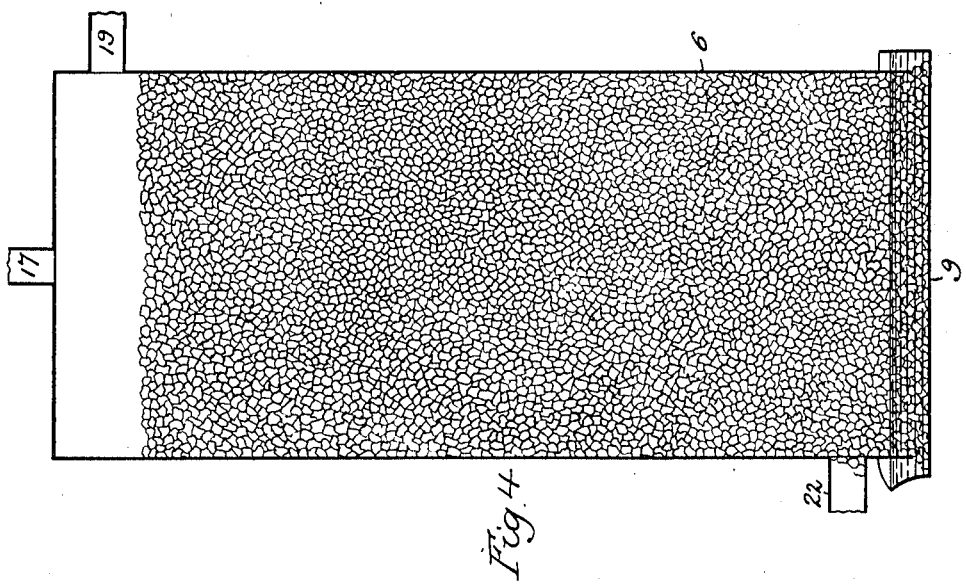
Figure 3:
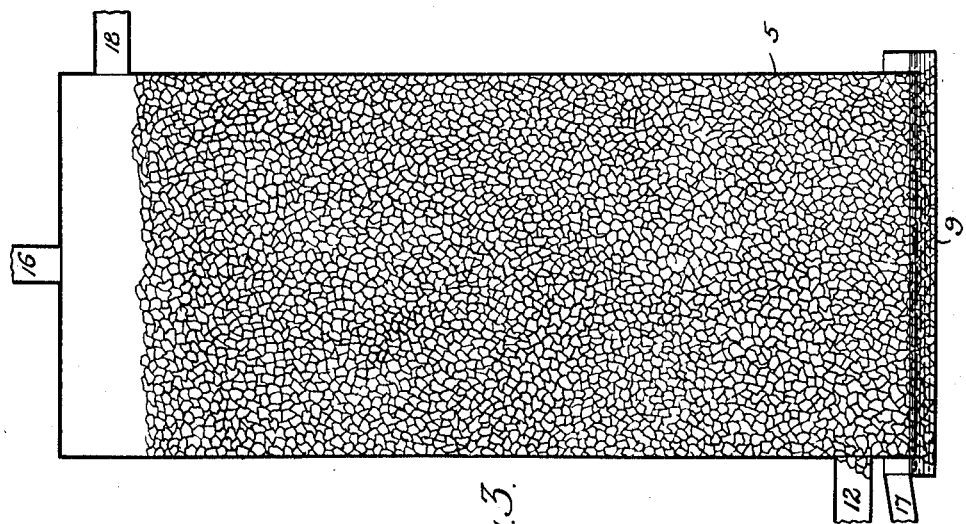

Figure 1 is a plan or top view illustrating, in diagrammatic form, apparatus for the practice of my invention, and Figs. 2, 3 and 4 are vertical sectional views, on an enlarged scale, of certain elements of said apparatus.

Previous to my invention, it has been customary to utilize for the manufacture of sulfuric acid, gases issuing from a furnace of the character before referred to, the gases being passed first through a Glover tower, wherein they are mixed with nitrous fumes in the usual manner, the mixed gases being then carried to lead chambers wherein they are further mixed with steam, as in accordance with the ordinary method of producing sulfuric acid by what is known as the "chamber" process, or the gases have been brought into contact with oxidizing or catalytic material, as in the "contact" process. For the economical working of either process, however, the proportion of sulfur dioxid in the gas should be fairly uniform and as high as practicable, and not below seven per cent. of the volume of gas. The gases, however, usually contain a much lower percentage of sulfur dioxid than the above noted minimum, which percentage is likely to be very variable, with the result that the amount of sulfuric acid produced from a given quantity of the gases, or a given chamber space, is small and the cost of manufacture high, furthermore, the low percentage of sulfur dioxid contained in some of the furnace gases would necessitate the use of lead chambers of such enormous dimensions as to be impracticable. In carrying out my invention, therefore, I so treat the furnace gases as to very materially increase the percentage of sulfur dioxid in the gases employed in the acid producing apparatus, and I am therefore enabled to greatly increase the quantity of sulfuric acid produced, and, when the chamber process is employed, am enabled to restrict the dimensions of the chambers within the bounds of practicability.

In Fig. 1 of the drawings, 1 represents the furnace, 2 the main which receives the gases from said furnace, 2ª a dust collector or separator, 3 the ordinary Glover tower, 4 what I term a "concentrator", 5 what I term a "saturator", 6 what I term a "regulator" and $x$ one of the lead chambers of the sulfuric acid apparatus.

The concentrator is shown in Fig. 2 and consists of a tower of any suitable cross-sectional shape and height, this tower being properly supported in a pan 9 so that the side walls of the tower are luted in the usual manner when the pan is filled with water or other liquid.

Communicating with one side of the tower, near the bottom of the latter, is an inlet pipe 10 for supplying the tower with the furnace gases, and near the top of the tower is a gas outlet pipe 11, another gas outlet pipe 12 communicating with the tower at an intermediate point.

At the top of the tower is a water supply pipe 13 which communicates with the interior of the tower through a series of properly sealed or luted openings 14, or through other and equivalent means whereby the water may be separated into a number of small streams or sprays distributed throughout the area of the tower and falling into the body of water contained in the pan 9 at the base of the tower.

It may be advisable in many cases to provide the tower with a mass of refractory material which will provide innumerable channels for the upward flow of gas and the downward flow of water as is customary in gas washers or scrubbers, the purpose of the tower being to bring the ascending gases into intimate contact with the descending and finely divided body of water.

The capacity of water to absorb sulfur dioxid is dependent upon its temperature, water at a temperature approaching the boiling point only absorbing about one-tenth of one per cent. by weight of sulfur dioxid and its absorbing capacity increasing as its temperature decreases until, at a temperature of 60° F., it can absorb or dissolve nine and four-tenths per cent. of its weight of sulfur dioxid.

Supposing therefore that water enters the top of the tower at a temperature approximating 60° F., while blast furnace gases enter the lower portion of the tower at a temperature considerably exceeding the boiling point of water, the result will be a gradually increasing rise in the temperature of the water as it flows from the top of the tower to the bottom of the same, and a constantly increasing capacity of the water to absorb or dissolve sulfur dioxid as the gases containing the same rise from the bottom toward the top of the tower.

In Fig. 2 of the drawing, I have indicated at the left hand side of the tower the gradual increase in the temperature of the water as it flows downwardly and beside the tower at the left, I have indicated the gradually increasing capacity of the water to take up sulfur dioxid as its temperature decreases toward the top of the tower.

By properly regulating the supplies of water and furnace gases admitted to the tower, all or substantially all of the sulfur dioxid contained in the gases will be absorbed by or dissolved in the water in the passage of the gases from the bottom to the top of the tower the large absorbing capacity of the cold water in the top of the tower rendering it impossible for any material percentage of sulfur dioxid to escape at the top of the tower if a portion of the gases rich in sulfur dioxid is allowed to escape from the tower at a lower point. Gases escaping at the pipe 11 will, in such case, consist mainly of atmospheric air, carbon dioxid and nitrogen, the two latter being much less soluble in water than is sulfur dioxid. As the water descends in the tower, and its temperature rises, its capacity to retain the sulfur dioxid decreases and the latter will be driven off, consequently, if an escape pipe is provided, at what may be termed a neutral point, say at the position of the pipe 12, corresponding with a water temperature of 120° F., or thereabout, and a portion of the gases are withdrawn from the column of furnace gases at this point, the gas thus withdrawn will contain practically all of the sulfur dioxid originally contained in the full volume of gases entering the tower at the bottom of the same. If, therefore, the entering gases contain, say four per cent. of sulfur dioxid and one-fourth of the total volume of gases is withdrawn at the pipe 12, the gases thus withdrawn will contain 16 per cent. of sulfur dioxid.

At the right hand side of Fig. 2, I have indicated the respective percentages of sulfur dioxid contained in the ascending volume of furnace gases.

It is impossible for any considerable quantity of sulfur dioxid to be carried out in solution in the water escaping at the bottom of the tower because of the high temperature of the water at that point.

That portion of the furnace gases containing 4 per cent. of sulfur dioxid conveyed directly to the Glover tower 3 and mixed therein with the nitrous fumes pass from the Glover tower through the pipe 20 to the lead chamber $x$ and by combining with these gases a proper proportion of the enriched gases from the pipe 12, as through a pipe 12$^a$, the gases entering the lead chamber $x$ may be enriched with sulfur dioxid to an extent which is subject to regulation and which will insure the economical production of acid in the lead chambers if the chamber process is employed, or the gases enriched with sulfur dioxid may be conveyed by the pipe 12$^a$ directly to the point of contact with the oxidizing or catalytic material if the contact process is used. In some cases, however, I prefer to free the sulfur dioxid from the carbon dioxid, nitrogen and other impurities or adulterants with which it may be combined in the gases issuing from the concentrator at the pipe 12, and for this reason I use in connection with the concentrator 4 the saturator 5 and the regulator 6.

The saturator 5 as shown in Fig. 3 consists of a tower which may be substantially similar to the tower and which receives in its lower portion the gases from the pipe 12, these gases as they rise being brought into contact with the descending body of water introduced by the supply pipe 16 at the top of the tower and distributed throughout the area of the tower by a contained mass of refractory material, or in any other convenient way, the water being removed from the bottom of the tower 15 at as low a temperature as possible and saturated with sulfur dioxid, the remaining gases which have been freed from the sulfur dioxid escaping at the pipe 18. If the water escapes at a temperature of 80° F., for example, it should contain about seven and nine-tenths per cent. by weight of sulfur dioxid and it is then conveyed through a pipe 17 to the regulator 6 in which it is heated so as to drive off the sulfur dioxid, the latter accumulating in the upper portion of the regulator in a substantially pure or only slightly diluted state, and being conveyed therefrom through a pipe 19 to the pipe 20 which receives the gases from the Glover tower, or directly to the contact apparatus.

The regulator is shown in Fig. 5 and consists of a tower substantially similar to that of the concentrator and saturator, the water, with sulfur dioxid in solution therein, entering this tower at the top through the pipe 17, and, as it descends being brought into contact with ascending volumes of hot furnace gases which enter the tower near the bottom through a pipe 22, directly from the dust collector or separator 2ª. In operating, the amount of water containing sulfur dioxid which is supplied to the tower, varies in accordance with the amount of sulfur dioxid required to give the desired percentage in the acid apparatus, while the amount of water admitted to the saturator tower is sufficient to take up the entire amount of sulfur dioxid from the gas entering the saturator through the pipe 12 from the concentrator.

The volume of hot gas admitted to the regulator from the dust collector 2ª is controlled to correspond with the amount of water saturated with sulfur dioxid which enters the top of the regulator, the object being to heat this water to a temperature at or near its boiling point. The water entering the upper portion of the regulator is, however, cold enough to condense any steam which may be generated in the lower portion of the regulator. The sulfur dioxid therefore escapes from the regulator tower in a comparatively pure state, being diluted slightly by the gases employed for heating the water to the boiling point in said tower.

Other heating agents than the furnace gases may be used for the heating of the water in the regulator, the heating of the water in the regulator by direct contact with the furnace gases being adopted simply as the cheapest and most convenient method of attaining the desired result.

The various pipes and flues of the apparatus may be provided with such valves or dampers as may be necessary to control or regulate the volume of flow therethrough.

Of the total volume of gases issuing from the furnace, the respective percentages conveyed to the Glover tower 3, concentrator 4 and regulator 6 will be dependent upon circumstances, such as the percentage of sulfur dioxid in the furnace gases, the extent of enrichment with sulfur dioxid of the gases entering the acid chamber $x$ and the amount of heat required in the regulator 6. Hence, no fixed formula can be relied upon, practice determining the distribution of the gases best adapted to secure the desired results in any particular case.

It will, of course, be understood that although I have shown the concentrator, saturator and regulator each in the form of a single tower, the number of towers constituting each of these elements of the apparatus may be multiplied to any desired extent, and the enriched gases may be removed between successive towers of the concentrator, if desired, and in some cases, instead of supplying the Glover tower with the furnace gas containing a low percentage of sulfur dioxid, I may supply said Glover tower with the enriched gases flowing from the pipe 12 of the concentrator, in which case, however, it may be necessary to raise the temperature of the enriched gases before admitting them to the Glover tower.

It will be understood, further, that the construction and arrangement of the various elements of the apparatus shown in the drawings is only diagrammatic and is adopted simply for the purpose of conveying an understanding of my invention and without any attempt to represent either the details of the different structures or a necessary arrangement of the various elements of the apparatus.

I claim:

1. In the process of producing sulfuric or sulfurous acid from furnace gases, the mode herein described of increasing the percentage of sulfur dioxid in said furnace gases, said mode consisting in causing said gases to flow in contact with a flowing body of water which, in its relation to the flow of the gases, is of gradually decreasing temperature and has a progressively increasing power of absorbing or dissolving sulfur dioxid, and removing a portion of the gases at the point where the desired enrichment of the same with sulfur dioxid has been effected.

2. In the process of producing sulfuric or sulfurous acid from furnace gases, the mode herein described of increasing the percentage of sulfur dioxid in said furnace gases, said mode consisting in causing said gases to flow in contact with a flowing body of water which, in its relation to the flow of the gases, is of gradually decreasing temperature and has a progressively increasing power of absorbing or dissolving sulfur dioxid, removing a portion of the gases rich in sulfur dioxid, at an intermediate point of the gas flow, and removing the remaining gases, substantially free from sulfur dioxid, at the point where the flow of the gases in contact with the water terminates.

3. In the process of producing sulfuric or sulfurous acid from furnace gases, the mode herein described of increasing the percentage of sulfur dioxid in said furnace gases, said mode consisting in causing said gases to flow in contact with a flowing and finely divided body of water, which, in its relation to the flow of the gases, is of gradually decreasing temperature and has a progressively increasing power of absorbing or dissolving sulfur dioxid, and removing a portion of the gases at a point where the desired enrichment of the same with sulfur dioxid has been effected.

4. In the process of producing sulfuric or sulfurous acid from furnace gases, the mode herein described of increasing the percentage of sulfur dioxid in said furnace gases, said mode consisting in causing said gases to flow in contact with a flowing and finely divided body of water, which, in its relation to the flow of the gases, is of gradually decreasing temperature and has a progressively increasing power of absorbing or dissolving sulfur dioxid, removing a portion of the gases rich in sulfur dioxid, at an intermediate point of the gas flow, and removing the remaining gases, substantially free from sulfur dioxid, at the point where the flow of the gases in contact with the water terminates.

5. In the process of producing sulfuric or sulfurous acid from furnace gases, the mode herein described of increasing the percentage of sulfur dioxid in said furnace gases, said mode consisting in subjecting an upwardly flowing stream of the gases to the action of a downwardly flowing body of water which, in its relation to the flow of the gases, is of gradually decreasing temperature and has a progressively increasing capacity for absorbing or dissolving sulfur dioxid, and removing a portion of the gases at the point where their desired enrichment with sulfur dioxid has been effected.

6. In the process of producing sulfuric or sulfurous acid from furnace gases, the mode herein described of increasing the percentage of sulfur dioxid in said furnace gases, said mode consisting in subjecting an upwardly flowing stream of the gases to the action of a downwardly flowing body of water which, in its relation to the flow of the gases, is of gradually decreasing temperature and has a progressively increasing capacity for absorbing or dissolving sulfur dioxid, removing a portion of the gases rich in sulfur dioxid at an intermediate point of the gas flow, and removing the remaining gases, substantially free from sulfur dioxid, at the point where the flow of the gases in contact with the water terminates.

7. In the process of producing sulfuric or sulfurous acid from furnace gases, the mode herein described of increasing the percentage of sulfur dioxid in said furnace gases, said mode consisting in subjecting an upwardly flowing stream of the gases to the action of a downwardly flowing and finely divided body of water which, in its relation to the flow of the gases, is of gradually decreasing temperature and has a progressively increasing capacity for absorbing or dissolving sulfur dioxid, and removing a portion of the gases at the point where their desired enrichment with sulfur dioxid has been effected.

8. In the process of producing sulfuric or sulfurous acid from furnace gases, the mode herein described of increasing the percentage of sulfur dioxid in said furnace gases, said mode consisting in subjecting an upwardly flowing stream of the gases to the action of a downwardly flowing and finely divided body of water which, in its relation to the flow of the gases, is of gradually decreasing temperature and has a progressively increasing capacity for absorbing or dissolving sulfur dioxid, removing a portion of the gases rich in sulfur dioxid, at an intermediate point of the gas flow, and removing the remaining gases, substantially free from sulfur dioxid, at the point where the flow of the gases in contact with the water terminates.

9. In the process of producing sulfuric or sulfurous acid from furnace gases, the mode herein described of increasing the percentage of sulfur dioxid in said furnace gases, said mode consisting in subjecting an upwardly flowing and finely divided stream of the gases to the action of a downwardly flowing and finely divided body of water which, in its relation to the flow of the gases, is of gradually decreasing temperature and has a progressively increasing capacity for absorbing or dissolving sulfur dioxid, and removing a portion of the gases at the point where their desired enrichment with sulfur dioxid has been effected.

10. In the process of producing sulfuric or sulfurous acid from furnace gases, the mode herein described of increasing the percentage of sulfur dioxid in said furnace gases, said mode consisting in subjecting an upwardly flowing and finely divided stream of the gases to the action of a downwardly flowing and finely divided body of water which, in its relation to the flow of the gases, is of gradually decreasing temperature and has a progressively increasing capacity for absorbing or dissolving sulfur dioxid, removing a portion of the gases rich in sulfur dioxid at an intermediate point of the gas flow, and removing the remaining gases, substantially free from sulfur dioxid, at the point where the flow of the gases in contact with the water terminates.

11. In the process of producing sulfuric or sulfurous acid from furnace gases, the mode herein described of separating sulfur dioxid from said furnace gases containing carbon dioxid or other impurities or adulterants, said mode consisting in causing said gases to flow in contact with a flowing stream of water which, in its relation to the gas flow, is of gradually decreasing temperature and has a progressively increasing capacity for absorbing or dissolving sulfur dioxid, removing a portion of said gases at the point where their desired enrichment with sulfur dioxid has been effected, and then bringing said removed gases into contact with a further body of water whereby the sulfur dioxid is absorbed or dissolved, and the gases with which it had been mixed are set free.

12. In the process of producing sulfuric or sulfurous acid from furnace gases, the mode herein described or separating sulfur dioxid from said furnace gases containing carbon dioxid or other impurities or adulterants, said mode consisting in causing said gases to flow in contact with a flowing stream of water which, in its relation to the gas flow, is of gradually decreasing temperature and has a progressively increasing capacity for absorbing or dissolving sulfur dioxid, removing a portion of the gases rich in sulfur dioxid at an intermediate point of the gas flow, removing the remaining gases, substantially free from sulfur dioxid, at the point where the flow of the gases in contact with the water terminates, and bringing the enriched gases into contact with a further body of water, whereby the sulfur dioxid is absorbed or dissolved, and the gases with which it had been mixed are set free.

13. In the process of producing sulfuric or sulfurous acid from furnace gases, the mode herein described of separating sulfur dioxid from said furnace gases containing carbon dioxid or other impurities or adulterants, said mode consisting in causing said gases to flow in contact with a flowing stream of water which, in its relation to the gas flow, is of gradually decreasing temperature and has a progressively increasing capacity for absorbing or dissolving sulfur dioxid, removing a portion of said gases at the point where their desired enrichment with sulfur dioxid has been effected, then bringing said removed gases into contact with a further body of water whereby the sulfur dioxid is absorbed or dissolved, and the gases with which it had been mixed are set free, and then heating the water to drive off the sulfur dioxid contained therein.

14. In the process of producing sulfuric or sulfurous acid from furnace gases, the mode herein described of separating sulfur dioxid from said furnace gases containing carbon dioxid or other impurities or adulterants, said mode consisting in causing said gases to flow in contact with a flowing stream of water which, in its relation to the gas flow, is of gradually decreasing temperature and has a progressively increasing capacity for absorbing or dissolving sulfur dioxid, removing a portion of the gas rich in sulfur dioxid at an intermediate point of the gas flow, removing the remaining gases, substantially free from sulfur dioxid, at the point where the flow of the gases in contact with the water terminates, bringing the enriched gases into contact with a further body of water, whereby the sulfur dioxid is absorbed or dissolved and the gases with which it had been mixed are set free, and then heating the water to drive off the sulfur dioxid contained therein.

15. In the process of producing sulfuric or sulfurous acid from furnace gases, the mode herein described of obtaining sulfur dioxid from said furnace gases, said mode consisting in causing said gases to flow in contact with a flowing body of water, which, in its relation to the flow of the gases, is of gradually decreasing temperature and has a progressively increasing capacity for absorbing or dissolving sulfur dioxid, removing a portion of said gases at a point where their desired enrichment with sulfur dioxid has been effected, bringing said enriched gases into contact with a further body of water whereby the sulfur dioxid is absorbed or dissolved and the gases with which it had been mixed are set free, heating said water to drive off the sulfur dioxid therefrom, and utilizing the furnace gases for the supply of such heat.

16. In the process of producing sulfuric or sulfurous acid from furnace gases, the mode herein described of obtaining sulfur dioxid from said furnace gases, said mode consisting in causing said gases to flow in contact with a flowing body of water, which, in its relation to the flow of the gases, is of gradually decreasing temperature and has a progressively increasing capacity for absorbing or dissolving sulfur dioxid, removing a portion of the gases rich in sulfur dioxid at an intermediate point of the gas flow, removing the remaining gases, substantially free from sulfur dioxid, at the point where the flow of the gases in contact with the water terminates, bringing the enriched gases into contact with a further body of water whereby the sulfur dioxid is absorbed or dissolved and the gases with which it had been mixed are set free, heating said water to drive off the sulfur dioxid therefrom, and utilizing the furnace gases for the supply of such heat.

17. The mode herein described of effecting the production of sulfuric or sulfurous acid from furnace gases, said mode consisting in passing a portion of the furnace gases through the Glover tower of the acid apparatus, flowing another portion of said gases in contact with a flowing body of water, which, in its relation to the gas flow, is of gradually decreasing temperature and has a progressively increasing capacity for absorbing or dissolving sulfur dioxid, removing a portion of said gases at the point where their desired enrichment with sulfur dioxid has been effected, and then combining said enriched gases, in regulated quantity, with the gases flowing from the Glover tower, to produce in said gases the desired percentage of sulfur dioxid for their further treatment in the acid apparatus and then converting into acid the sulfur dioxid thus obtained.

18. The mode herein described of producing sulfuric or sulfurous acid from furnace gases, said mode consisting in flowing a portion of said gases through the Glover tower of the acid apparatus, flowing another portion of said gases in contact with a flowing body of water, which, in its relation to the gas flow, is of gradually decreasing temperature and has a progressively increasing capacity for absorbing or dissolving sulfur dioxid, removing a portion of the gases, rich in sulfur dioxid, at an intermediate point of the gas flow, removing the remaining gases, substantially free from sulfur dioxid, at the point where the flow of the gases in contact with the water terminates, and combining the enriched gases, in regulated quantity, with the gases flowing from the Glover tower, to produce in said gases the desired percentage of sulfur dioxid for their further treatment in the acid apparatus and then converting into acid the sulfur dioxid thus obtained.

19. The mode herein described of producing sulfuric or sulfurous acid from furnace gases, said mode consisting in flowing a portion of said gases through the Glover tower of the acid apparatus, flowing another portion of said gases in contact with a flowing body of water, which, in its relation to the gas flow, is of gradually decreasing temperature and has a progressively increasing capacity for absorbing or dissolving sulfur dioxid, removing a portion of the gases at the point where their desired enrichment with sulfur dioxid has been effected, bringing said remaining gases into contact with a further body of water whereby the sulfur dioxid is absorbed or dissolved and the gases with which it had been mixed are set free, heating said water to drive off the sulfur dioxid therefrom, and then combining said sulfur dioxid, in regulated quantity, with the gases flowing from the Glover tower to produce, in said gases the desired percentage of sulfur dioxid for their further treatment in the acid apparatus and then converting into acid the sulfur dioxid thus obtained.

20. The mode herein described of producing sulfuric or sulfurous acid from furnace gases, said mode consisting in flowing a portion of said gases through the Glover tower of the acid apparatus, flowing another portion of said gases in contact with a flowing body of water, which, in its relation to the gas flow, is of gradually decreasing temperature and has a progressively increasing capacity to absorb or dissolve sulfur dioxid, removing a portion of the gases, rich in sulfur dioxid, at an intermediate point of the gas flow, removing the remaining gases, substantially free from sulfur dioxid, at the point where the flow of the gases in contact with the water terminates, bringing the enriched gases into contact with a further body of water, whereby the sulfur dioxid is absorbed or dissolved and the gases with which it had been mixed are set free, heating said water to drive off the sulfur dioxid therefrom, and then combining said sulfur dioxid in regulated quantity with the gases flowing from the Glover tower to produce in said gases the desired percentage of sulfur dioxid for their treatment in the acid apparatus and then converting into acid the sulfur dioxid thus obtained.

21. The mode herein described of producing sulfuric or sulfurous acid from furnace gases, said mode consisting in flowing a portion of said gases through the Glover tower of the acid apparatus, flowing another portion of said gases in contact with a flowing body of water, which, in its relation to the gas flow, is of gradually decreasing temperature and has a progressively increasing capacity to absorb or dissolve sulfur dioxid, removing a portion of the gases at the point where their desired enrichment with the sulfur dioxid has been effected, bringing said enriched gases into contact with a further body of water, whereby the sulfur dioxid is absorbed or dissolved and the gases with which it had been mixed are set free, heating said water to drive off the sulfur dioxid therefrom, utilizing the furnace gases for the supply of such heat, and then combining the sulfur dioxid, in regulated quantity, with the gases flowing from the Glover tower, to produce in said gases the desired percentage of sulfur dioxid for their further treatment in the acid apparatus and then converting into acid the sulfur dioxid thus obtained.

22. The mode herein described of producing sulfuric or sulfurous acid from furnace gases, said mode consisting in flowing a portion of said gases through the Glover tower of the acid apparatus, flowing another portion of said gases in contact with a flowing body of water, which, in its relation to the gas flow, is of gradually decreasing temperature and has a progressively increasing capacity to absorb or dissolve sulfur dioxid, removing a portion of the gases, rich in sulfur dioxid, at an intermediate point of the gas flow, removing the remaining gases, substantially free from sulfur dioxid, at the point where the flow of the gases in contact with the water terminates, bringing the enriched gases into contact with a further body of water, whereby the sulfur dioxid is absorbed or dissolved and the gases with which it had been mixed are set free, heating said water to drive off the sulfur dioxid therefrom, utilizing the furnace gases for the supply of such heat, and then combining the sulfur dioxid, in regulated quantity, with the gases flowing from the Glover tower, to produce in said gases the desired percentage of sulfur dioxid for their further treatment in the acid apparatus and then converting into acid the sulfur dioxid thus obtained.

In testimony whereof, I have signed my name to this specification in the presence of two subscribing witnesses.

UTLEY WEDGE.

Witnesses:
KATE A. BEADLE,
HAMILTON D. TURNER.